US012768733B2

(12) United States Patent
Ota et al.

(10) Patent No.: US 12,768,733 B2
(45) Date of Patent: Oct. 20, 2026

(54) PRESSURE-SENSING ELEMENT INCLUDING A GUARD AND A MEMBRANE INCLUDING A TRENCH, AND PRESSURE SENSOR INCLUDING PRESSURE-SENSING ELEMENT

(71) Applicant: Murata Manufacturing Co., Ltd., Nagaokakyo (JP)

(72) Inventors: Mari Ota, Nagaokakyo (JP); Koichi Yoshida, Nagaokakyo (JP); Ryohei Hamazaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 307 days.

(21) Appl. No.: 18/423,455

(22) Filed: Jan. 26, 2024

(65) Prior Publication Data

US 2024/0167901 A1 May 23, 2024

Related U.S. Application Data

(63) Continuation of application No. PCT/JP2022/028239, filed on Jul. 20, 2022.

(30) Foreign Application Priority Data

Aug. 31, 2021 (JP) ................................ 2021-141346

(51) Int. Cl.
*G01L 9/00* (2006.01)

(52) U.S. Cl.
CPC .................................. *G01L 9/0072* (2013.01)

(58) Field of Classification Search
CPC ... G01L 9/0073; G01L 9/0048; G01L 9/0045; G01L 19/146; G01L 19/0618; B81B 7/0048; B81B 7/0054
See application file for complete search history.

(56) References Cited

U.S. PATENT DOCUMENTS 4,972,716 A * 11/1990 Tobita ................. G01L 19/0076 338/4
5,242,863 A * 9/1993 Xiang-Zheng ........ G01L 9/0042 257/E21.546
(Continued)

FOREIGN PATENT DOCUMENTS

JP 2004354105 A 12/2004
JP 2006343115 A 12/2006

OTHER PUBLICATIONS

International Search Report in PCT/JP2022/028239, mailed Sep. 27, 2022, 3 pages.
(Continued)

*Primary Examiner* — Tran M. Tran
(74) *Attorney, Agent, or Firm* — Keating & Bennett, LLP

(57) ABSTRACT

A pressure-sensing element includes a membrane, a substrate, a guard, and a base. The membrane includes a diaphragm. The substrate is opposite to the membrane in a thickness direction. The guard is between the membrane and the substrate and is bonded to the membrane and the substrate. The guard has a closed shape. The base is in an enclosed space defined by the membrane, the substrate, and the guard. The base is bonded to the membrane and is separated from the substrate and the guard. The base includes a first electrode opposed to the diaphragm with a pressure reference chamber between the first electrode and the diaphragm to provide electrostatic capacitance. The base except for the first electrode is bonded to the membrane. A trench extends in the thickness direction entirely through the membrane and partially through the guard.

19 Claims, 11 Drawing Sheets

(56) References Cited

U.S. PATENT DOCUMENTS

| | | | | | |
|---|---|---|---|---|---|
| 6,006,607 | A * | 12/1999 | Bryzek | G01L 9/0054 | 338/42 |
| 6,229,190 | B1 * | 5/2001 | Bryzek | G01L 19/147 | 257/419 |
| 6,604,425 | B1 * | 8/2003 | Hsu | G01L 1/086 | 73/718 |
| 7,268,435 | B2 * | 9/2007 | Ohta | H10W 76/157 | 257/E23.189 |
| 8,468,888 | B2 * | 6/2013 | Wu | B81C 1/00158 | 73/714 |
| 8,607,638 | B2 * | 12/2013 | Jeung | G01P 15/14 | 73/754 |
| 8,973,438 | B2 * | 3/2015 | Kim | G01C 19/5755 | 73/514.33 |
| 9,061,888 | B2 * | 6/2015 | Pahl | B81B 7/0048 | |
| 9,176,018 | B2 * | 11/2015 | Qi | B81B 3/0027 | |
| 9,366,593 | B2 * | 6/2016 | Vaupel | G01L 9/0042 | |
| 9,708,175 | B2 * | 7/2017 | Qi | B81B 3/0027 | |
| 9,731,959 | B2 * | 8/2017 | Sengupta | B81B 7/0048 | |
| 9,828,238 | B2 * | 11/2017 | Gurin | B81C 1/00674 | |
| 9,829,405 | B2 * | 11/2017 | Kuisma | G01L 9/0072 | |
| 9,975,756 | B2 * | 5/2018 | Duqi | G01L 19/04 | |
| 10,006,825 | B2 * | 6/2018 | Brida | G01L 19/04 | |
| 10,060,820 | B2 * | 8/2018 | Chen | G01L 19/146 | |
| 10,180,370 | B2 * | 1/2019 | Daves | B81B 3/0097 | |
| 10,239,748 | B2 * | 3/2019 | Maggi | B81B 7/0048 | |
| 10,302,514 | B2 * | 5/2019 | Liu | G01L 9/0052 | |
| 11,348,880 | B2 * | 5/2022 | Yoshida | G01L 19/147 | |
| 11,402,288 | B2 * | 8/2022 | Feyh | G01L 9/0048 | |
| 12,012,328 | B2 * | 6/2024 | Dawson | B81B 7/0048 | |
| 12,054,385 | B2 * | 8/2024 | Yen | B81B 7/0051 | |
| 12,122,667 | B2 * | 10/2024 | Schaller | B81C 1/00325 | |
| 12,345,593 | B2 * | 7/2025 | Kishigui | B81B 7/0029 | |
| 12,565,418 | B2 * | 3/2026 | Basavanna | B81B 3/0021 | |
| 2007/0089514 | A1 * | 4/2007 | Takeyari | G01P 15/123 | 73/514.33 |
| 2013/0205899 | A1 * | 8/2013 | Wu | G01P 15/123 | 73/510 |
| 2015/0114129 | A1 * | 4/2015 | Chen | G01L 9/0055 | 73/721 |
| 2015/0360935 | A1 * | 12/2015 | Grabmaier | B81C 1/00238 | 438/51 |
| 2016/0341759 | A1 * | 11/2016 | Yamaji | G01P 15/123 | |
| 2017/0253477 | A1 | 9/2017 | Baldo et al. | | |
| 2020/0317508 | A1 | 10/2020 | Brandl et al. | | |
| 2024/0391758 | A1 * | 11/2024 | Yen | B81B 7/0048 | |
| 2025/0276893 | A1 * | 9/2025 | Tentori | B81B 7/0061 | |

OTHER PUBLICATIONS

Written Opinion in PCT/JP2022/028239, mailed Sep. 27, 2022, 3 pages.

* cited by examiner

PRESSURE-SENSING ELEMENT INCLUDING A GUARD AND A MEMBRANE INCLUDING A TRENCH, AND PRESSURE SENSOR INCLUDING PRESSURE-SENSING ELEMENT

CROSS REFERENCE TO RELATED APPLICATIONS

This application claims the benefit of priority to Japanese Patent Application No. 2021-141346 filed on Aug. 31, 2021 and is a Continuation Application of PCT Application No. PCT/JP2022/028239 filed on Jul. 20, 2022. The entire contents of each application are hereby incorporated herein by reference.

BACKGROUND OF THE INVENTION

1. Field of the Invention

The present invention relates to pressure-sensing elements to sense external pressure and to pressure sensors including the pressure-sensing elements.

2. Description of the Related Art

Pressure-sensing elements capable of sensing minute pressure may be based on micro-electro-mechanical systems (MEMS) technology.

Such a pressure-sensing element based on the MEMS technology includes a sensitive portion capable of sensing external pressure and a surrounding portion surrounding the sensitive portion. The sensitive portion would become defective if affected by the force of impact exerted on the surrounding portion from outside the pressure-sensing element.

The sensitive portion and the surrounding portion of the pressure sensor disclosed in U.S. Patent Application Publication No. 2017/0253477 are mostly separated from each other with a groove provided therebetween. The sensitive portion and the surrounding portion are only partially joined together by an arm. This reduces the possibility that the impact exerted on the surrounding portion will spread to the sensitive portion.

The pressure sensor disclosed in U.S. Patent Application Publication No. 2017/0253477 includes a cap disposed above the sensitive portion. This eliminates or reduces the possibility that foreign matter, such as water, will come into contact with the sensitive portion.

The arm that forms a link between the sensitive portion and the surrounding portion of the pressure sensor disclosed in U.S. Patent Application Publication No. 2017/0253477 can act as a pathway to the sensitive portion for the stress arising from the surrounding portion or any other internal portion of the pressure sensor. Consequently, the sensitive portion may fail to ensure the accuracy of pressure measurement.

The cap of the pressure sensor disclosed in U.S. Patent Application Publication No. 2017/0253477 has a ventilation hole through which the sensitive portion is exposed to the outside air. There is a possibility that foreign matter, such as water, might be led into the pressure sensor through the ventilation hole and might come into contact with the sensitive portion. Consequently, the sensitive portion may fail to ensure the accuracy of pressure measurement.

SUMMARY OF THE INVENTION

Example embodiments of the present invention provide pressure-sensing elements that are each less susceptible to stress and foreign matter resulting in improved pressure measurement accuracy.

A pressure-sensing element according to an example embodiment of the present invention includes a membrane including a diaphragm, a substrate opposite to the membrane in a thickness direction, a guard located between the membrane and the substrate and bonded to the membrane and the substrate, the guard having a closed shape, and a base in an enclosed space defined by the membrane, the substrate, and the guard, the base being bonded to the membrane and spaced away from the substrate and the guard, in which a portion of a surface of the base closer than another surface of the base to the membrane is opposed to the diaphragm with a pressure reference chamber provided between the portion of the surface and the diaphragm to provide electrostatic capacitance, the base except for the portion of the surface of the base closer than the another surface of the base to the membrane is bonded to the membrane, one or more trenches with a depth direction coinciding with the thickness direction is provided at least in the guard, and at least one of the one or more trenches extends in the thickness direction entirely through the membrane and at least partially through the guard.

Example embodiments of the present invention are advantageous in that the accuracy of pressure measurement is less likely to be affected by stress and foreign matter.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
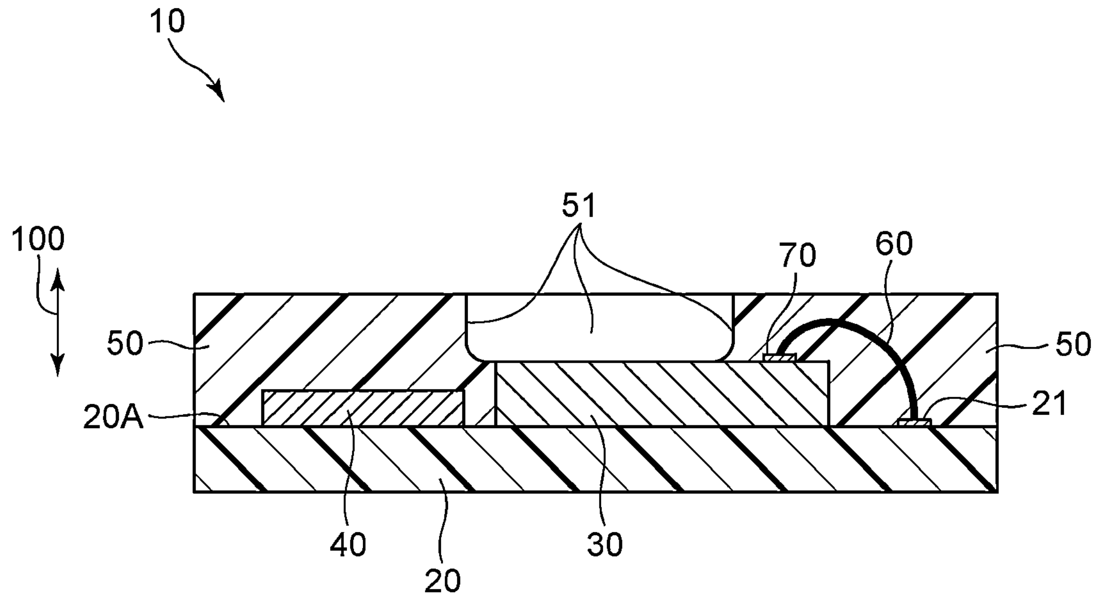
FIG. 1 is a longitudinal sectional view of a pressure sensor according to a first example embodiment of the present invention.

A pressure-sensing element according to an example embodiment of the present invention includes a membrane, a substrate, a guard, and a base. The membrane includes a diaphragm. The substrate is opposite to the membrane in a thickness direction. The guard is located between the membrane and the substrate and is bonded to the membrane and the substrate. The guard has a closed shape. The base is in an enclosed space defined by the membrane, the substrate, and the guard. The base is bonded to the membrane and is spaced away from the substrate and the guard. A portion of a surface of the base closer than another surface of the base to the membrane is opposed to the diaphragm of the membrane with a pressure reference chamber located between the portion of the surface and the diaphragm to provide electrostatic capacitance. The base except for the portion of the surface of the base closer than the other surface of the base to the membrane is bonded to the membrane. One or more trenches with a depth direction coinciding with the thickness direction are provided at least in the guard. At least one of the trenches extends in the thickness direction entirely through the membrane and at least partially through the guard.

As described above, at least one of the trenches extends entirely through the membrane and at least partially through the guard. This structure eliminates or reduces the possibility that stress applied to an external portion will be exerted on the base through the membrane and the guard. The external portion is closer than the trench to the outer side portion when viewed in the thickness direction. The pressure-sensing element is thus less susceptible to stress in terms of its accuracy of pressure measurement.

The base is preferably located in the enclosed space and is not exposed to the outside. The base is thus prevented from coming into contact with foreign matter, such as water. The pressure-sensing element is therefore less susceptible to foreign matter in terms of its accuracy of pressure measurement.

The base is spaced away from both the substrate and the guard. This layout eliminates or reduces the possibility that stress exerted on the substrate and the guard will be transferred directly to the base. The pressure-sensing element is thus less susceptible to stress in terms of its accuracy of pressure measurement.

In the pressure-sensing element, a slit extending in the thickness direction may be provided on at least one of a side of the guard closer to the membrane and a side of the guard closer to the substrate. The slit provided on the side of the guard closer to the membrane may extend outward from the enclosed space when viewed in the thickness direction. The slit provided on the side of the guard closer to the substrate may extend inward from the trench when viewed in the thickness direction.

When the substrate bends with its surface being curved convexly toward the membrane, the bending stress exerted on the substrate is transferred to the membrane through the guard and is then transferred to the base through the membrane. Transfer, to the base, of the bending stress having reached an internal portion of the guard is reduced or prevented by the slit. The internal portion of the guard is farther than the trench from the outer side portion when viewed in the thickness direction. Similarly, transfer, to the base, of the bending stress having reached the external portion of the guard is reduced or prevented by the trench. As described above, the external portion of the guard is closer than the trench to the outer side portion when viewed in the thickness direction.

The guard of the pressure-sensing element may include a groove in an outer side surface of the guard and connected to at least one of the trenches.

When the substrate bends, the transfer of bending stress from the substrate to the base is reduced or prevented by the groove.

The trenches may be provided at least in the guard of the pressure-sensing element. With two adjacent ones of the trenches being located side by side as viewed in the thickness direction and being offset from each other in the thickness direction (i.e., not in alignment or not in positional agreement with each other), at least a portion of the guard and at least a portion of the membrane may define a meandering portion including a winding portion that extends up and down in the thickness direction within a region extending from a junction of the guard and the substrate to a junction of the membrane and the base.

When the substrate bends, the bending stress exerted on the substrate is transferred to the base through the guard and the membrane. As described above, at least a portion of the guard and at least a portion of the membrane define a meandering portion including a winding portion that extends up and down in the thickness direction within the region extending from the junction of the guard and the substrate to the junction of the membrane and the base. This means that the path over which the bending stress exerted on the substrate is transferred to the base is elongated. This eliminates or reduces the possibility that the bending stress will reach the base.

The substrate of the pressure-sensing element may include a protrusion protruding toward the base from a surface positioned toward the base.

When the membrane bends, the base can possibly bend excessively in conjunction with the membrane, and the resultant deviation in the distance between the base and the diaphragm can reduce the accuracy of pressure measurement. When the membrane bends and the base bends excessively in conjunction with the membrane, stress would concentrate on the junction of the base and the membrane, and as a result, the base and the membrane would become damaged. This problem is overcome by the structure described above, in which the base including the protrusion is in close proximity to the substrate. This reduces or prevents the excessive bending of the base.

The base of the pressure-sensing element may include a base trench that is provided in a surface positioned toward the pressure reference chamber and that is connected to the pressure reference chamber.

As described above, the pressure reference chamber is connected to the base trench. This means that an extra volume is added to the space in which the pressure reference chamber is located. Given that pressure-sensing elements may be produced in large numbers, this feature leads to a reduction of the product-to-product variation in the internal pressure of the pressure reference chamber.

The path over which the stress is transferred from the junction of the base and the membrane to a portion of the base that is across from the diaphragm is diverted by the base trench. This eliminates or reduces the possibility that the stress will reach the portion of the base, that is, the portion located across from the diaphragm.

The pressure reference chamber and the enclosed space in the pressure-sensing element may be in communication.

As described above, the pressure reference chamber and the enclosed space defined by the membrane, the substrate, and the guard are in communication. This means that an extra volume is added to the space in which the pressure reference chamber is located. Given that pressure-sensing elements may be produced in large numbers, this feature leads to a reduction of the product-to-product variation in the internal pressure of the pressure reference chamber.

The base of the pressure-sensing element may include a first electrode and a second electrode separate from the first electrode. The first electrode may face the pressure reference chamber. The second electrode may be bonded to the membrane with an insulating member interposed therebetween.

If the first electrode and the second electrode define a single electrode, not only a first current but also a second current is output from the electrode including the first electrode and the second electrode. The first current is equivalent to the amount of change in electrostatic capacitance between the first electrode and the diaphragm, and the second current is equivalent to the amount of change in electrostatic capacitance between the second electrode and the membrane. The second current is not relevant to the displacement of the diaphragm such that the second current can reduce the accuracy of pressure measurement. For example, a portion of the output current corresponds to the pressure drop associated with the temperature characteristics of the electrostatic capacitance between the second electrode and the membrane. This can reduce the accuracy of pressure measurement. This problem is overcome by the structure described above, in which the first electrode is separate from the second electrode so that reduction of the accuracy of pressure measurement caused by the second current is reduced or prevented.

The guard of the pressure-sensing element may be electrically connected to the substrate.

With the guard being electrically connected to a ground electrode on the substrate, the guard defines and functions as a shield against extraneous electromagnetic waves. This reduces or prevents the possibility that the accuracy of the electrical output from the base will be reduced by the extraneous electromagnetic waves.

A pressure sensor according to an example embodiment of the present invention includes the pressure-sensing element, a mounting substrate, and a resin package. The mounting substrate includes a mounting surface on which the pressure-sensing element is mounted. The resin package is disposed on the mounting surface of the mounting substrate and covers the pressure-sensing element. The resin package includes an exposure hole through which the diaphragm is exposed.

With this feature, the pressure-sensing element is securely fastened to the mounting substrate by the resin package.

The pressure-sensing element of the pressure sensor may further include a pad to provide an external electrical connection to the base. The pad may be disposed opposite the base with the trench located therebetween when viewed in the thickness direction.

This means that the pad is discretely located away from the base. The pad and the base are located on opposite sides with the trench provided therebetween. During production of the pressure sensor, the resin package is spread over the mounting surface of the mounting substrate to cover the pad. However, the trench reduces or prevents the resin package from spreading to the base. This reduces or prevents the possibility that a portion of the base will be accidentally covered with the resin package. The pressure sensor can therefore operate without a reduction of the accuracy of pressure measurement.

First Example Embodiment

FIG. 1 is a longitudinal sectional view of a pressure sensor according to a first example embodiment of the present invention. The pressure sensor, which is denoted by 10, is capable of sensing pressure. For example, the pressure sensor 10 is to be mounted on a mobile object, such as an automobile, or on a consumer-use device, such as a smartphone or a smartwatch.

Referring to FIG. 1, the pressure sensor 10 includes a substrate 20, a pressure-sensing element 30, an application-specific integrated circuit (ASIC) 40, and a resin package 50. The application-specific integrated circuit 40 is hereinafter referred to as ASIC 40.

The substrate 20 is plate-shaped. The substrate 20 is an example of a mounting substrate. The substrate 20 is a rigid substrate, such as a glass epoxy substrate or a ceramic substrate, for example. In some example embodiments, however, the substrate 20 is, for example, a lead frame.

The substrate 20 has a thin rectangular or substantially rectangular parallelepiped shape. The thickness direction of the substrate 20 is denoted by 100. The thickness direction 100 is perpendicular or substantially perpendicular to an upper surface 20A of the substrate 20. The substrate 20 is rectangular or substantially rectangular when viewed in the thickness direction 100. However, it is not required that the substrate 20 has a rectangular or substantially rectangular parallelepiped shape (i.e., be rectangular or substantially rectangular when viewed in the thickness direction 100). For example, the substrate 20 may have a polygonal or substantially polygonal shape other than a rectangular or substantially rectangular shape when viewed in the thickness direction 100.

The pressure-sensing element 30 is intended for pressure sensing. The pressure-sensing element 30 is, for example, a capacitive element based on micro-electro-mechanical systems (MEMS) technology.

The pressure-sensing element 30 is attached to the upper surface 20A of the substrate 20 with a die attach film, a die attach adhesive, or the like. The upper surface 20A is an example of a mounting surface. That is, the pressure-sensing element 30 is mounted on the upper surface 20A of the substrate 20. With the pressure-sensing element 30 mounted on the substrate 20, the thickness direction of the pressure-sensing element 30 in the first example embodiment coincides with the thickness direction 100 of the substrate 20. It is not required that the pressure-sensing element 30 is attached to the substrate 20 in the manner described above. That is, various known methods may be used as alternatives.

The pressure-sensing element 30 has a rectangular or substantially rectangular parallelepiped shape. However, it is not required that the pressure-sensing element 30 has a rectangular or substantially rectangular parallelepiped shape (i.e., rectangular or substantially rectangular when viewed in the thickness direction 100). For example, the pressure-sensing element 30 may have a polygonal or substantially polygonal shape other than a rectangular or substantially rectangular shape when viewed in the thickness direction 100. Alternatively, for example, the pressure-sensing element 30 may be in the shape of a circular column.

The configuration of the pressure-sensing element 30 will be described in detail later.

The ASIC 40 is mounted on the upper surface 20A of the substrate 20. The ASIC 40 includes a package that covers an integrated circuit. The package in the first example embodiment is made of silicon, for example. In some example embodiments however, the package is made of a material other than silicon, for example.

The ASIC 40 is attached to the upper surface 20A of the substrate 20 with a die attach film, a die attach adhesive, or the like. This is how the ASIC 40 is mounted on the upper surface 20A of the substrate 20. It is not required that the ASIC 40 be attached to the substrate 20 in the manner described above. That is, various known methods may be used as alternatives.

The ASIC 40 has a rectangular or substantially rectangular parallelepiped shape. However, it is not required that the ASIC 40 has a rectangular or substantially rectangular parallelepiped shape (i.e., rectangular or substantially rectangular when viewed in the thickness direction 100). For example, the ASIC 40 may have a polygonal or substantially polygonal shape other than a rectangular or substantially rectangular shape when viewed in the thickness direction 100.

The pressure-sensing element 30 and the ASIC 40 are electrically connected to each other with a bonding wire 60 and the substrate 20 therebetween. This is described below in detail. The pressure-sensing element 30 is provided with a pad 70. The substrate 20 is provided with a pad 21, which is disposed on the upper surface 20A. The bonding wire 60 defines an electrical connection between the pads 70 and 21. A wiring pattern (not illustrated) is provided on the upper surface 20A of the substrate 20. The wiring pattern extends from the pad 21. The wiring pattern defines an electrical connection between the ASIC 40 and the pad 21.

For convenience, one pad 70, one pad 21, and one bonding wire 60 are illustrated in FIG. 1. However, the number of those components are not limited to one. For example, the pressure-sensing element 30 according to the first example embodiment is provided with three pads 70 (pads denoted by 71, 72, and 73 in FIG. 3). The pads 71, 72, and 73 are provided for the respective pads 21 and the respective bonding wires 60.

It is not required that the pressure-sensing element 30 and the ASIC 40 are electrically connected to each other in the manner described above. For example, the bonding wires may define an electrical connection between the pressure-sensing element 30 and the ASIC 40 without including the substrate 20.

The ASIC 40 includes a signal processing circuit configured or programmed to process a signal output by the pressure-sensing element 30 and to output the resultant signal to the substrate 20. For example, the ASIC 40 includes a converter, a filter, a temperature sensor, a processor, and memory. Upon receipt of a voltage signal from the pressure-sensing element 30, the converter converts the voltage signal into a digital signal. The digital signal from the converter is filtered through the filter. The temperature sensor measures the temperature. The processor corrects the filtered digital signal based on the temperature measured by the temperature sensor. Information such as correction factors for use in correcting the digital signal based on the temperature measured by the temperature sensor is stored in the memory.

The resin package 50 is made of resin, such as epoxy resin, for example. The resin package 50 is disposed on the upper surface 20A of the substrate 20. The resin package 50 covers the upper surface 20A of the substrate 20, the pressure-sensing element 30, the ASIC 40, and the bonding wire 60.

The resin package 50 includes an exposure hole 51. A portion of the pressure-sensing element 30 or, more specifically, a portion of the upper surface of the pressure-sensing element 30 is exposed to the outside of the pressure sensor 10 through the exposure hole 51. The exposed portion includes a region in which a diaphragm 32A of a membrane 32 (see FIG. 2) is located. The membrane 32 will be described later.

The following describes, in detail, the configuration of the pressure-sensing element 30.

Figure 2:
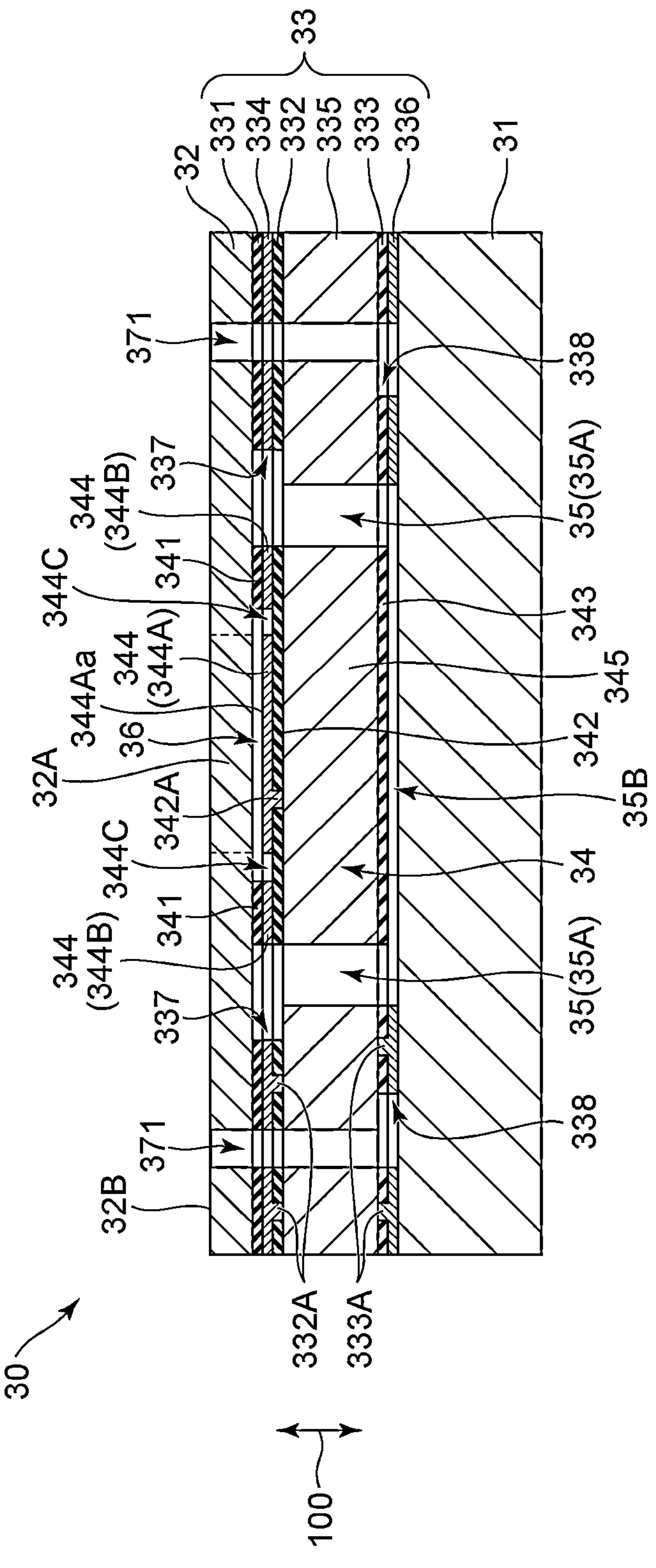
FIG. 2 is a longitudinal sectional view of a pressure-sensing element according to an example embodiment of the present invention.
Figure 3:
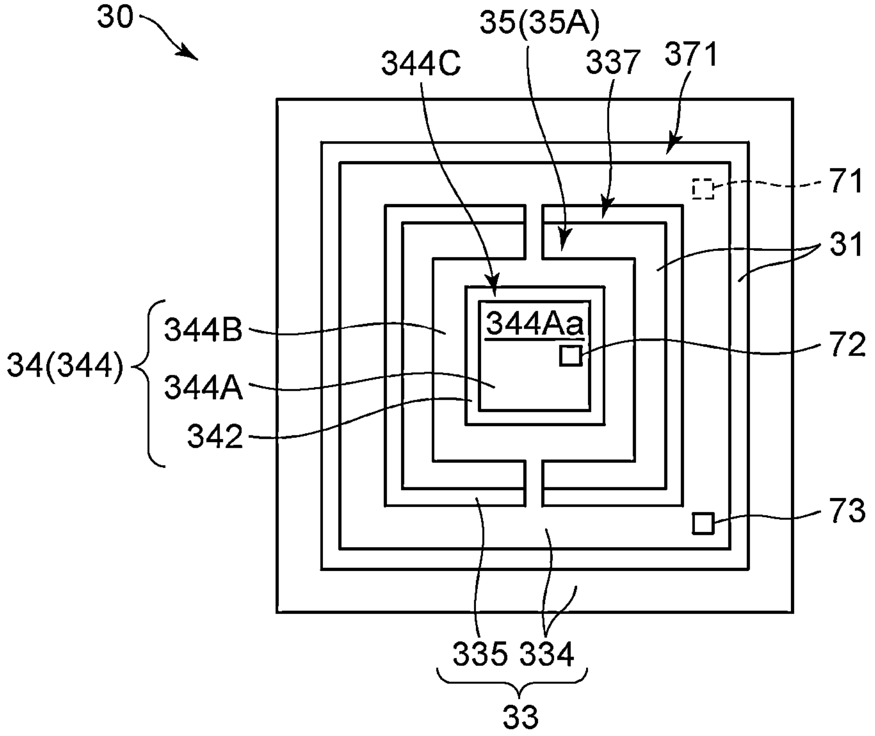
FIG. 3 is a plan view of the pressure-sensing element in FIG. 2, illustrating elements thereof, except for a membrane and a first insulating layer.

FIG. 2 is a longitudinal sectional view of a pressure-sensing element. FIG. 3 is a plan view of the pressure-sensing element in FIG. 2, illustrating its elements except for the membrane and a first insulating layer.

Referring to FIGS. 2 and 3, the pressure-sensing element 30 includes a substrate 31, the membrane 32, a guard 33, and a base 34. The pressure-sensing element 30 may include a passivation film (not illustrated) that makes it waterproof and ensures an insulating property. For example, the passivation film is made of silicon dioxide ($SiO_2$) or silicon nitride ($Si_3N_4$) and covers outer surfaces of the membrane 32 and the guard 33.

The substrate 31 and the membrane 32 are disposed on opposite sides in the thickness direction 100 with a clearance provided therebetween. The substrate 31 and the membrane 32 are each made of an electrically conductive material. The substrate 31 and the membrane 32 in the first example embodiment are made of silicon, for example. The membrane 32 is thinner than the substrate 31 and can bend due to the application of external pressure.

The guard 33 is located between the substrate 31 and the membrane 32. The guard 33 has a closed shape when viewed in the thickness direction 100. The guard 33 is bonded to the substrate 31 and the membrane 32. The substrate 31, the membrane 32, and the guard 33 define an enclosed space 35.

The guard 33 includes three insulating layers (a first insulating layer 331, a second insulating layer 332, and a third insulating layer 333) and three conductive layers (a first conductive layer 334, a second conductive layer 335, and a third conductive layer 336).

The three insulating layers (the first insulating layer 331, the second insulating layer 332, and the third insulating layer 333) are each made of an electrical insulating material. The three insulating layers (the first insulating layer 331, the second insulating layer 332, and the third insulating layer 333) in the first example embodiment are made of silicon dioxide ($SiO_2$), for example.

The three conductive layers (the first conductive layer 334, the second conductive layer 335, and the third conductive layer 336) are each made of an electrically conductive material. For example, the first conductive layer 334 and the third conductive layer 336 in the first example embodiment are made of polysilicon (Poly-Si), and the second conductive layer 335 in the first example embodiment is made of silicon.

The first insulating layer 331 is bonded to the membrane 32. The first conductive layer 334 is bonded to a surface of the first insulating layer 331 or, more specifically, the opposite surface from the membrane 32. The second insulating layer 332 is bonded to a surface of the first conductive layer 334 or, more specifically, the opposite surface from the first insulating layer 331. The second conductive layer 335 is bonded to a surface of the second insulating layer 332 or, more specifically, the opposite surface from the first conductive layer 334. The third insulating layer 333 is bonded to a surface of the second conductive layer 335 or, more specifically, the opposite surface from the second insulating layer 332. The third conductive layer 336 is bonded to a surface of the third insulating layer 333 or, more specifically, the opposite surface from the second conductive layer 335.

A surface of the third conductive layer 336 or, more specifically, the opposite surface from the third insulating layer 333 is bonded to the substrate 31. The third conductive layer 336 is thus electrically connected to the substrate 31.

The second insulating layer 332 includes a conductive portion 332A, which is made of an electrically conductive material. The first conductive layer 334 and the second conductive layer 335 are electrically connected to each other with the conductive portion 332A therebetween.

The third insulating layer 333 includes a conductive portion 333A, which is made of an electrically conductive material. The second conductive layer 335 and the third conductive layer 336 are electrically connected to each other with the conductive portion 333A therebetween.

This means that the three conductive layers (the first conductive layer 334, the second conductive layer 335, and the third conductive layer 336) included in the guard 33 are electrically connected to the substrate 31.

The second conductive layer 335 in the first example embodiment is thicker than the other conductive layers (the first conductive layer 334 and the third conductive layer 336) and the insulating layers (the first insulating layer 331, the second insulating layer 332, and the third insulating layer 333). In the first example embodiment, the three conductive layers and the two conductive layers other than the second conductive layer 335 are equal or substantially equal in thickness or substantially equal in thickness. The relationship between the thicknesses of the conductive layers and the insulating layers is not limited to the above.

In some example embodiments, not all of the layers described above are included in the guard 33. For example, the guard 33 does not include the second insulating layer 332, in which case the first conductive layer 334 and the second conductive layer 335 are bonded together.

The base 34 is disposed in the enclosed space 35. The base 34 in the first example embodiment has a rectangular or substantially rectangular parallelepiped shape. In some example embodiments, however, the base 34 may be, for example, in the shape of a circular column or may have any other shape. The base 34 is bonded to the membrane 32 and is separated from the substrate 31 and the guard 33. With the base 34 being located in the enclosed space 35, a trench 35A and a clearance 35B define the enclosed space 35. The trench 35A in the enclosed space 35 is a space between the base 34 and the guard 33. The trench 35A has a closed or substantially closed shape when viewed in the thickness direction 100 (see FIG. 3). The clearance 35B in the enclosed space 35 is a space between the base 34 and the substrate 31.

The base 34 includes three insulating layers (a first insulating layer 341, a second insulating layer 342, and a third insulating layer 343) and two conductive layers (a first conductive layer 344 and a second conductive layer 345).

The first insulating layer 341, the second insulating layer 342, the third insulating layer 343, the first conductive layer 344, and the second conductive layer 345 of the base 34 correspond to the first insulating layer 331, the second insulating layer 332, the third insulating layer 333, the first conductive layer 334, and the second conductive layer 335, respectively, of the guard 33. Each of the layers defining the base 34 and the corresponding one of the layers defining the guard 33 are made of the same kind of material and are equal in thickness. For example, the first insulating layer 341 and the corresponding layer, namely, the first insulating layer 331 are equal or substantially equal in thickness and are made of the same kind of material (e.g., silicon dioxide). The same holds true for the other layers.

During production of the pressure-sensing element 30, each of the layers defining the base 34 and the corresponding one of the layers defining the guard 33 are laid as one layer and is then separated into two layers by, for example, etching or any other known method. For example, one insulating layer on the membrane 32 is separated into two insulating layers (the first insulating layer 331 and the first insulating layer 341) by etching or any other known method. Some of the empty spaces from which the layers have been partially removed by etching or any other known method define the enclosed space 35 described above and a trench 371, which will be described later.

The first insulating layer 341 is bonded to the membrane 32. The first conductive layer 344 is bonded to a surface of the first insulating layer 341 or, more specifically, the opposite surface from the membrane 32. The second insulating layer 342 is bonded to a surface of the first conductive layer 344 or, more specifically, the opposite surface from the first insulating layer 341. The second conductive layer 345 is bonded to a surface of the second insulating layer 342 or, more specifically, the opposite surface from the first conductive layer 344. The third insulating layer 343 is bonded to a surface of the second conductive layer 345 or, more specifically, the opposite surface from the second insulating layer 342.

The third insulating layer 343 faces the substrate 31 with a clearance left between the substrate 31 and a surface of the third insulating layer 343 or, more specifically, the opposite surface from the second conductive layer 345. The space between the third insulating layer 343 and the substrate 31 is the above-described clearance 35B of the enclosed space 35.

The second insulating layer 342 includes a conductive portion 342A, which is made of an electrically conductive material. A first electrode 344A of the first conductive layer 344 and the second conductive layer 345 are electrically connected to each other with the conductive portion 342A therebetween. The first electrode 344A will be described later.

In the first example embodiment, the layers defining the base 34 are matched with the layers defining the guard 33. For example, the second insulating layer 342 of the base 34 is omitted when the guard 33 is not provided with the second insulating layer 332.

The first conductive layer 344 includes the first electrode 344A and a second electrode 344B, which is separated from the first electrode 344A. The first electrode 344A and the second electrode 344B are separated from each other by a clearance 344C, which has a closed shape.

The second electrode 344B is electrically connected to the first conductive layer 334 of the guard 33 (see FIG. 3). In some example embodiments, however, the second electrode 344B is not electrically connected to the first conductive layer 334.

The first insulating layer 341 has a closed shape when viewed in the thickness direction 100. The first insulating layer 341 and the first electrode 344A are not bonded together. That is, the first electrode 344A and the membrane 32 are disposed with a space therebetween. The space is a pressure reference chamber 36. A surface 344Aa of the first electrode 344A is oriented toward the pressure reference chamber 36. The surface 344Aa is portion of a surface of the base 34 closer than the other surface of the base 34 to the membrane 32. The surface 344Aa opposed to the membrane 32 with the pressure reference chamber 36 located therebetween. A portion of the membrane 32 or, more specifically, the portion that is across from the surface 344Aa is the diaphragm portion 32A. The diaphragm portion 32A is marked off with imaginary broken lines from the other portion of the membrane 32.

The first insulating layer 341 is bonded to the second electrode 344B. This means that the second electrode 344B is bonded to the membrane 32 with the first insulating layer 341 disposed therebetween. The first insulating layer 341 is an example of an insulating member. The base 34 except for the above-described portion (the first electrode 344A) of the surface of the base 34 closer than the other surface of the base 34 to the membrane 32 is bonded to the membrane 32. That is, the second electrode 344B is bonded to the membrane 32.

With the first electrode 344A and the diaphragm 32A facing each other with the pressure reference chamber 36 therebetween, electrostatic capacitance can be provided. The electrostatic capacitance varies with the distance between the first electrode 344A and the diaphragm 32A.

The diaphragm portion 32A faces the exposure hole 51 of the resin package 50 on the opposite side from the pressure reference chamber 36. Accordingly, the diaphragm 32A is placed under pressure exerted from the outside of the pressure sensor 10 through the exposure hole 51. As the pressure increases, the bending load exerted on the diaphragm portion 32A toward the pressure reference chamber 36 increases such that the diaphragm 32A comes closer to the first electrode 344A. As a result, greater electrostatic capacitance is provided. The magnitude of pressure exerted on the diaphragm portion 32A can be determined based on the amount of electrostatic capacitance.

Figure 4:
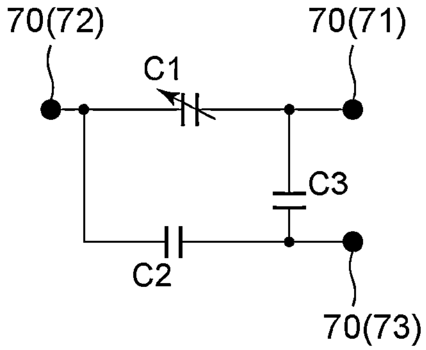
FIG. 4 is an equivalent circuit diagram of the pressure-sensing element in FIG. 1.

FIG. 4 is an equivalent circuit diagram of the pressure-sensing element in FIG. 1. The pads 70 or, more specifically, three pads denoted by 71, 72, and 73 are illustrated in FIG. 4. The pad 71 is disposed on the membrane 32. As illustrated in FIG. 3, the pad 72 is disposed on the first electrode 344A of the base 34, and the pad 73 is disposed on the first conductive layer 334 of the guard 33. The membrane 32 is not illustrated in FIG. 3. For this reason, the pad 71 in FIG. 3 is indicated with broken lines.

As described above, the pads 71, 72, and 73 are electrically connected to the ASIC 40. The pad 71 is intended to provide an external electrical connection to the membrane 32. For example, the pad 71 in the first example embodiment is intended to provide an electrical connection between the membrane 32 and the ASIC 40. The pad 72 is intended to provide an external electrical connection to the first electrode 344A of the base 34. For example, the pad 72 in the first example embodiment is intended to provide an electrical connection between the first electrode 344A and the ASIC 40. The pad 73 is intended to provide an external electrical connection to the first conductive layer 334 of the guard 33. For example, the pad 73 in the first example embodiment is intended to provide an electrical connection between the first conductive layer 334 and the ASIC 40.

The pads 71, 72, and 73 are exposed to the outside of the pressure-sensing element 30 through empty spaces (not explicitly illustrated in FIG. 3) from which, for example, layers laid over the pads 71, 72, and 73 have been partially removed by etching or any other method.

The ASIC 40 calculates an electrostatic capacitance C1 between the diaphragm portion 32A and the first electrode 344A from voltage or current between the pads 71 and 72 and then calculates the pressure on the diaphragm 32A from the electrostatic capacitance C1. The ASIC 40 is capable of calculating an electrostatic capacitance C2 between the second conductive layer 345 of the base 34 and the substrate 31 from voltage or current between the pads 72 and 73. Similarly, the ASIC 40 is capable of calculating an electrostatic capacitance C3 between the membrane 32 and the first conductive layer 334 of the guard 33 from voltage or current between the pads 71 and 73.

The pressure-sensing element 30 includes a trench. More specifically, the pressure-sensing element 30 in the first example embodiment includes the trench 371, which extends through the membrane 32 and the guard 33. As illustrated in FIG. 3, the trench 371 has a closed shape when viewed in the thickness direction 100.

As illustrated in FIG. 2, the trench 371 is provided in a surface 32B of the membrane 32. The direction of the depth of the trench 371 coincides with the thickness direction 100. The trench 371 extends in the thickness direction 100 through the membrane 32 and the guard 33.

The trench 371 does not necessarily extend entirely through the guard 33. The trench 371 may extend partially through the guard 33. In other words, it is preferable that the trench 371 extend in the thickness direction 100 entirely through the membrane 32 and at least partially through the guard 33. For example, the trench 371 may extend through the membrane 32, the first insulating layer 331, the first conductive layer 334, and the second insulating layer 332 and into an upper portion of the second conductive layer 335. In this case, the trench 371 does not extend through a lower portion of the second conductive layer 335, the third insulating layer 333, and the third conductive layer 336.

The pressure-sensing element 30 may include two or more trenches. In this case, it is preferable that the trenches are provided at least in the guard 33. The trenches each may extend partially or entirely through the guard 33. It is preferable that at least one of the trenches extend in the thickness direction 100 entirely through the membrane 32 and at least partially through the guard 33. In other words, it is preferable that at least one of the trenches is structurally the same or substantially the same as the trench 371.

For example, the trench 371 and another trench may be provided on opposite sides with the enclosed space 35 located therebetween. The trench on the opposite side from the trench 371 may be structurally different from the trench 371. For example, the trench is provided in the guard 33 but not in the membrane 32. The trench may nevertheless be structurally the same or substantially the same as the trench 371.

The trench 371 and another trench, which will be described later, are empty spaces from which one or more of the layers defining the pressure-sensing element have been at least partially removed by etching or any other known, for example.

The guard 33 includes a slit 337 and a slit 338. Although the slits 337 and 338 are provided in the guard 33 in the first example embodiment, the slits 337 and 338 are optional.

As illustrated in FIG. 2, the slit 337 is provided on the side of the guard 33 closer to the membrane 32 in the thickness direction 100. The slit 337 may thus be regarded as a clearance provided between the guard 33 and the membrane 32 in the thickness direction 100. The slit 337 is an empty space from which a portion of the first insulating layer 331, a portion of the first conductive layer 334, and a portion of the second insulating layer 332 have been removed by, for example, etching or any other known method. The slit 337 as described above is located between the second conductive layer 335 and the membrane 32.

It is not required that the dimension of the slit 337 in the thickness direction 100 is as illustrated in FIG. 2. For example, the slit 337 may be an empty space from which a portion of the first insulating layer 331 and a portion of the first conductive layer 334 have been removed. The slit 337 as described above is located between the second insulating layer 332 and the membrane 32 and is shallower than the one illustrated in FIG. 2.

As illustrated in FIG. 3, the slit 337 extends outward from the trench 35A in the enclosed space 35 when viewed in the thickness direction 100. That is, the slit 337 extends from the trench 35A in the enclosed space 35 toward the trench 371.

The slit 338 is provided on the side of the guard 33 closer to the substrate 31 in the thickness direction 100. The slit 338 may thus be regarded as a clearance provided between the guard 33 and the substrate 31 in the thickness direction 100. The slit 338 is an empty space from which a portion of the third insulating layer 333 and a portion of the third conductive layer 336 have been removed by, for example, etching or any other known method. The slit 338 as described above is located between the second conductive layer 335 and the substrate 31.

It is not required that the dimension of the slit 338 in the thickness direction 100 is as illustrated in FIG. 2. For example, the slit 338 may be an empty space from which portion of the third conductive layer 336 has been removed. The slit 338 as described above is located between the third insulating layer 333 and the substrate 31 and is shallower than the one illustrated in FIG. 2.

The slit 338 extends inward from the trench 371 when viewed in the thickness direction 100. That is, the slit 338 extends from the trench 371 toward the trench 35A in the enclosed space 35.

The guard 33 may include only one of the slits 337 and 338.

At least one of the trenches or, more specifically the trench 371 in the first example embodiment extends entirely through the membrane 32 and at least partially through the guard 33. This structure eliminates or reduces the possibility that stress applied to an external portion will be exerted on the base 34 through the membrane 32 and the guard 33. The external portion is closer than the trench 371 to the outer side portion when viewed in the thickness direction 100. The pressure-sensing element 30 is thus less susceptible to stress in terms of its accuracy of pressure measurement.

The base 34 in the first example embodiment is disposed in the enclosed space 35 and is not exposed to the outside. The base 34 is thus prevented from coming into contact with foreign matter, such as water. The pressure-sensing element 30 is thus less susceptible to foreign matter in terms of its accuracy of pressure measurement.

The base 34 in the first example embodiment is spaced apart from both the substrate 31 and the guard 33. This layout eliminates or reduces the possibility that stress exerted on the substrate 31 and the guard 33 will be transferred directly to the base 34. The pressure-sensing element 30 is thus less susceptible to stress in terms of its accuracy of pressure measurement.

When the substrate 31 bends with its surface being curved convexly toward the membrane 32, the bending stress exerted on the substrate 31 is transferred to the membrane 32 through the guard 33 and is then transferred to the base 34 through the membrane 32. In the first example embodiment, however, transfer, to the base 34, of the bending stress having reached an internal portion of the guard 33 is reduced or prevented by the slits 337 and 338. The internal portion is farther than the trench 371 from the outer side portion when viewed in the thickness direction 100. Similarly, transfer, to the base 34, of the bending stress having reached the external portion of the guard 33 is reduced or prevented by the trench 371. As described above, the external portion of the guard 33 is closer than the trench 371 to the outer side portion when viewed in the thickness direction 100.

If the first electrode 344A and the second electrode 344B define a single electrode, not only a first current but also a second current is output from the electrode including the first electrode 344A and the second electrode 344B. The first current is equivalent to the amount of change in electrostatic capacitance between the first electrode 344A and the diaphragm 32A, and the second current is equivalent to the amount of change in electrostatic capacitance between the second electrode 344B and the membrane 32. The second current is not relevant to the displacement of the diaphragm 32A such that the second current can reduce the accuracy of pressure measurement. For example, a portion of the output current corresponds to the pressure drop associated with the temperature characteristics of the electrostatic capacitance between the second electrode 344B and the membrane 32. This can reduce the accuracy of pressure measurement. This problem is addressed by the first example embodiment, in which the first electrode 344A is separate from the second electrode 344B so that the reduction of the accuracy of pressure measurement caused by the second current as described above will be eliminated or reduced.

The guard 33 in the first example embodiment is electrically connected to the substrate 31. For example, the guard 33 is electrically connected to a ground electrode on the substrate 31, in which case the guard 33 defines as a shield against extraneous electromagnetic waves. This eliminates or reduces the possibility that the accuracy of the electrical output from the base 34 will be reduced by the extraneous electromagnetic waves.

The pressure-sensing element 30 in the first example embodiment is securely fastened to the substrate 20 by the resin package 50.

Figure 5:
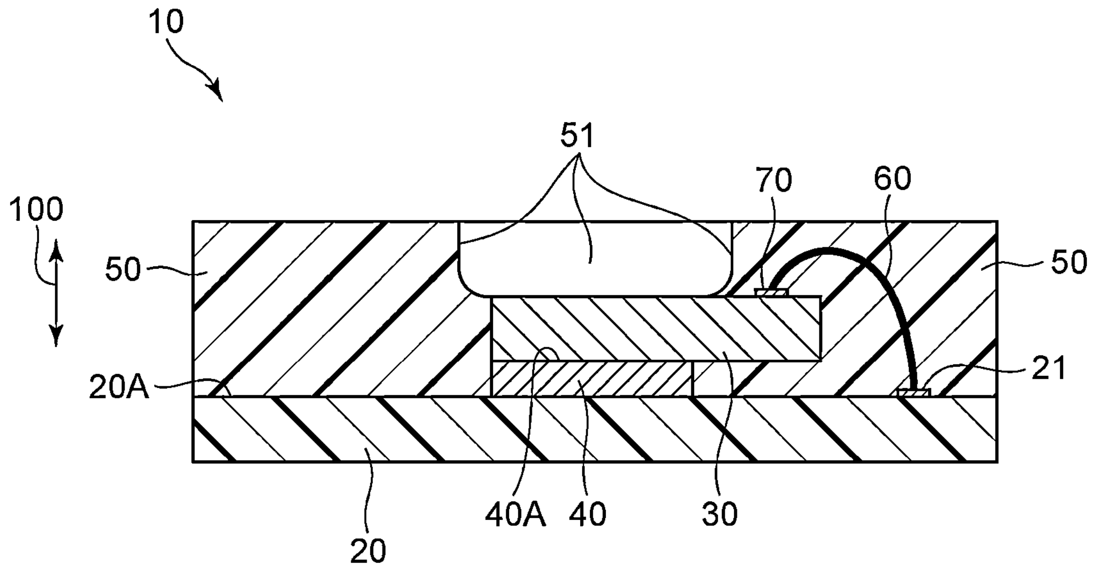
FIG. 5 is a longitudinal sectional view of a modification of the pressure sensor according to the first example embodiment of the present invention.

Although the pressure-sensing element 30 and the ASIC 40 in the first example embodiment are located side by side on the upper surface 20A of the substrate 20, the layout of the pressure-sensing element 30 and the ASIC 40 is not limited to the one illustrated in FIG. 1. FIG. 5 is a longitudinal sectional view of a modification of the pressure sensor according to the first example embodiment of the present invention. For example, the pressure-sensing element 30 may be mounted on an upper surface 40A of the ASIC 40, as illustrated in FIG. 5.

Figure 6:
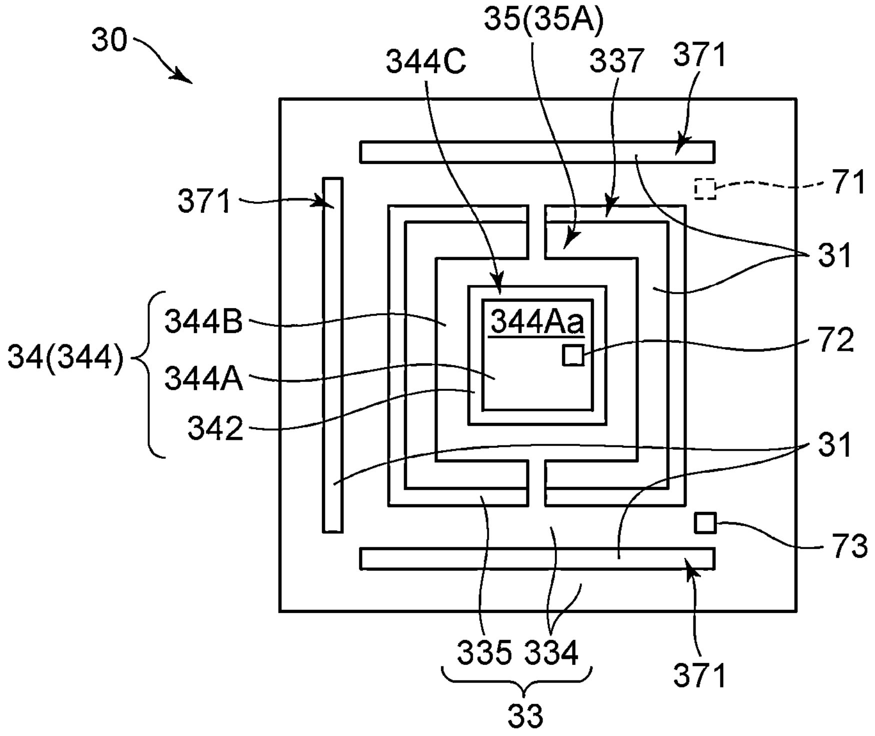
FIG. 6 is a plan view of a modification of the pressure-sensing element in FIG. 3.

As illustrated in FIG. 3, the trench 371 in the first example embodiment has a closed shape when viewed in the thickness direction 100. However, it is not required that the trench 371 have a closed shape when viewed in the thickness direction 100. FIG. 6 is a plan view of a modification of the pressure-sensing element in FIG. 3. As illustrated in FIG. 6 for example, the trench 371 may be discontinuous. The trench 371 illustrated in FIG. 3 has a rectangular or substantially rectangular shape defined by four sides when viewed in the thickness direction 100. That is, the base 34 is enclosed on all sides by the trench 371. Referring to FIG. 6, the base 34 is not completely enclosed by the trench 371.

Figure 7:
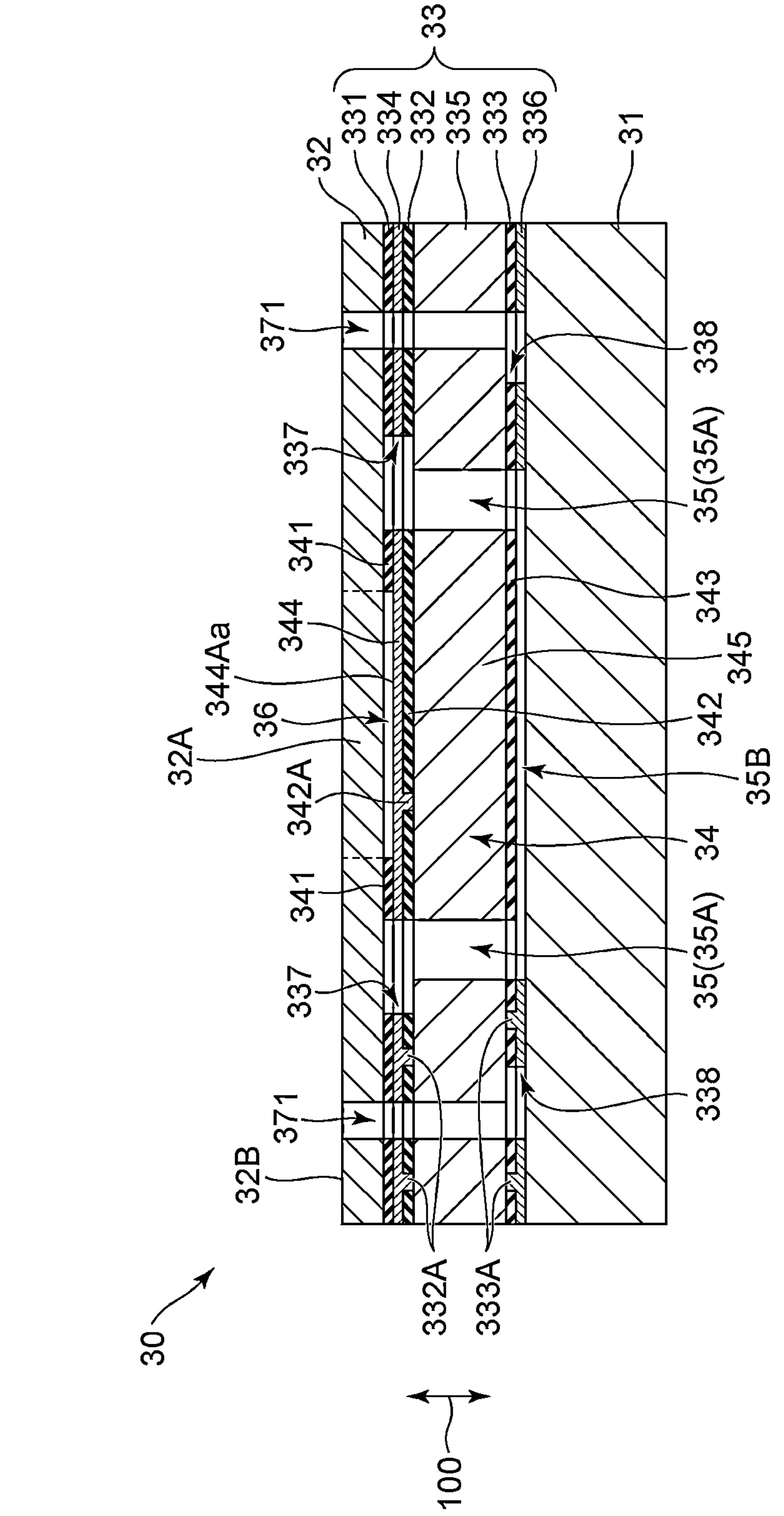
FIG. 7 is a longitudinal sectional view of a modification of the pressure-sensing element in FIG. 2.

As illustrated in FIGS. 2 and 3, the first conductive layer 344 in the first example embodiment includes the first electrode 344A and the second electrode 344B separate from the first electrode 344A. It is however not required that the clearance 344C illustrated in FIGS. 2 and 3 is provided. That is, the first conductive layer 344 may be a single electrode (see FIG. 7). FIG. 7 is a longitudinal sectional view of a modification of the pressure-sensing element in FIG. 2.

Second Example Embodiment

Figure 8:
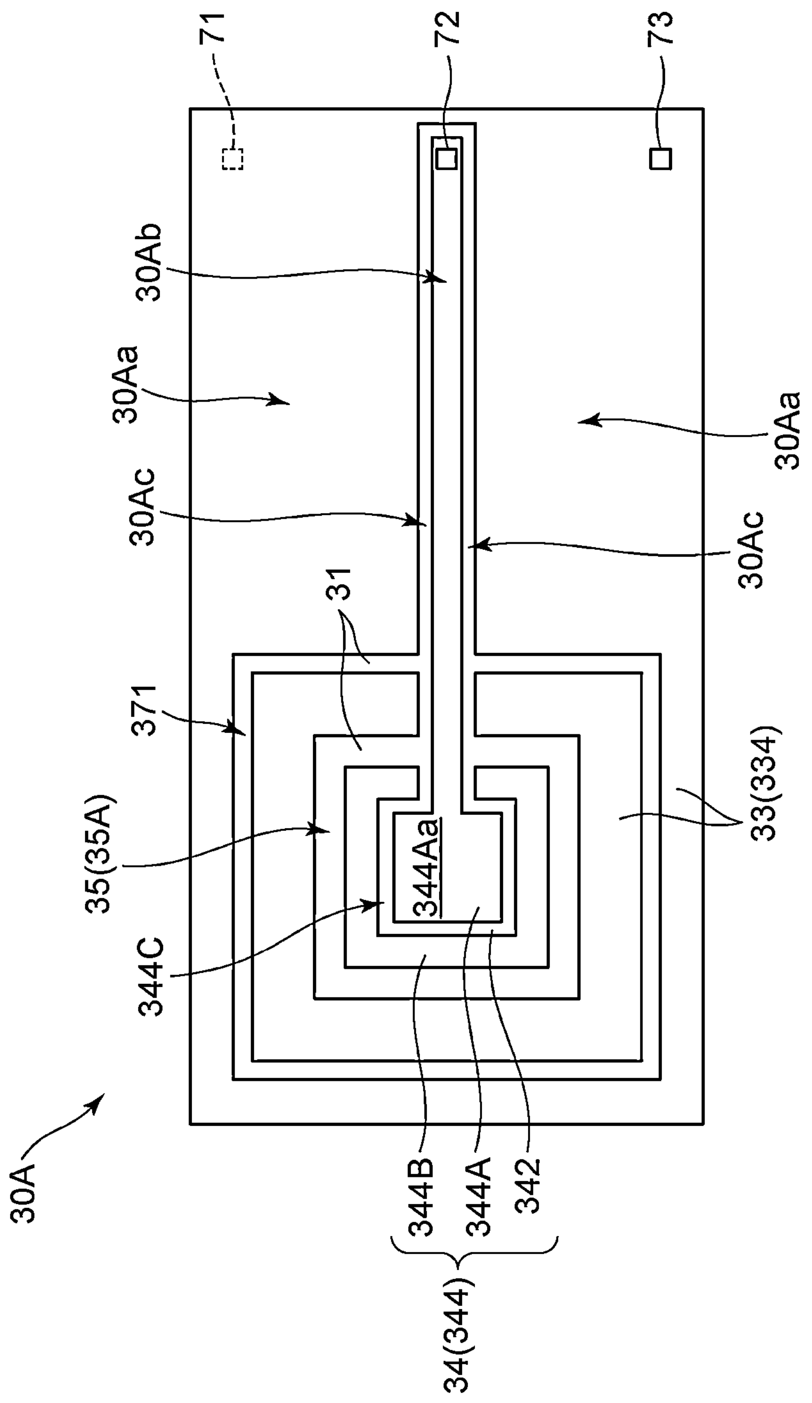
FIG. 8 is a plan view of a pressure-sensing element included in a pressure sensor according to a second example embodiment of the present invention, illustrating elements thereof, except for a membrane and a first insulating layer.

FIG. 8 is a plan view of a pressure-sensing element included in a pressure sensor according to a second example embodiment of the present invention, illustrating its elements except for the membrane and the first insulating layer. The pressure sensor according to the second example embodiment differs from the pressure sensor 10 according to the first example embodiment in that the pad 72 is disposed opposite the base 34 with the trench 371 located therebetween when viewed in the thickness direction 100. The following describes the differences between the first example embodiment and the present example embodiment. Each element of the pressure sensor 10 according to the first example embodiment and the corresponding element of the pressure sensor according to the present example embodiment are denoted by the same reference sign. In general, features common to the pressure sensor 10 according to the first example embodiment and the pressure sensor according to the present example embodiment will not be further described here unless otherwise necessary.

The pressure sensor according to the second example embodiment includes a pressure-sensing element 30A. As illustrated in FIG. 8, the pressure-sensing element 30A is larger in size than the pressure-sensing element 30 of the pressure sensor 10 according to the first example embodiment when viewed in the thickness direction 100. The pressure-sensing element 30A includes an extension that extends outward from one side of the trench 371 when viewed in the thickness direction 100. Referring to FIG. 8, the extension includes a first region 30Aa, a second region 30Ab, and a trench 30Ac. The first region 30Aa is linked to the first conductive layer 334 of the guard 33. The second region 30Ab is linked to the first electrode 344A of the base 34. The first region 30Aa and the second region 30Ab are separated by the trench 30Ac. The trench 30Ac includes two sections located on opposite sides and extending from the clearance 344C into the extension. The two mutually opposite sections of the trench 30Ac are joined together in the extension. The second region 30Ab in the extension is thus surrounded with the trench 30Ac, which is a path enclosing a region in which the second region 30Ab and the first electrode 344A are linked to each other.

The pad 73 is located in the first region 30Aa. The pad 72 is located in the second region 30Ab. The pad 72 is disposed opposite the base 34 with the trench 371 located therebetween when viewed in the thickness direction 100. The pad 72 is electrically connected to the base 34. As with the pads 72 and 73, the pad 71 in the second example embodiment is disposed opposite the base 34 with the trench 371 located therebetween when viewed in the thickness direction 100.

The pad 72 in the second example embodiment is discretely located away from the base 34. The pad 72 and the base 34 are located on opposite sides with the trench 371 provided therebetween. During production of the pressure sensor 10, the resin package 50 is spread over the upper surface 20A of the substrate 20 to cover the pad 72. However, the trench 371 prevents the resin package 50 from spreading to the base 34. This eliminates or reduces the possibility that a portion of the base 34 will be accidentally covered with the resin package 50. The pressure sensor 10 can therefore operate without a reduction of the accuracy of pressure measurement.

Third Example Embodiment

Figure 9:
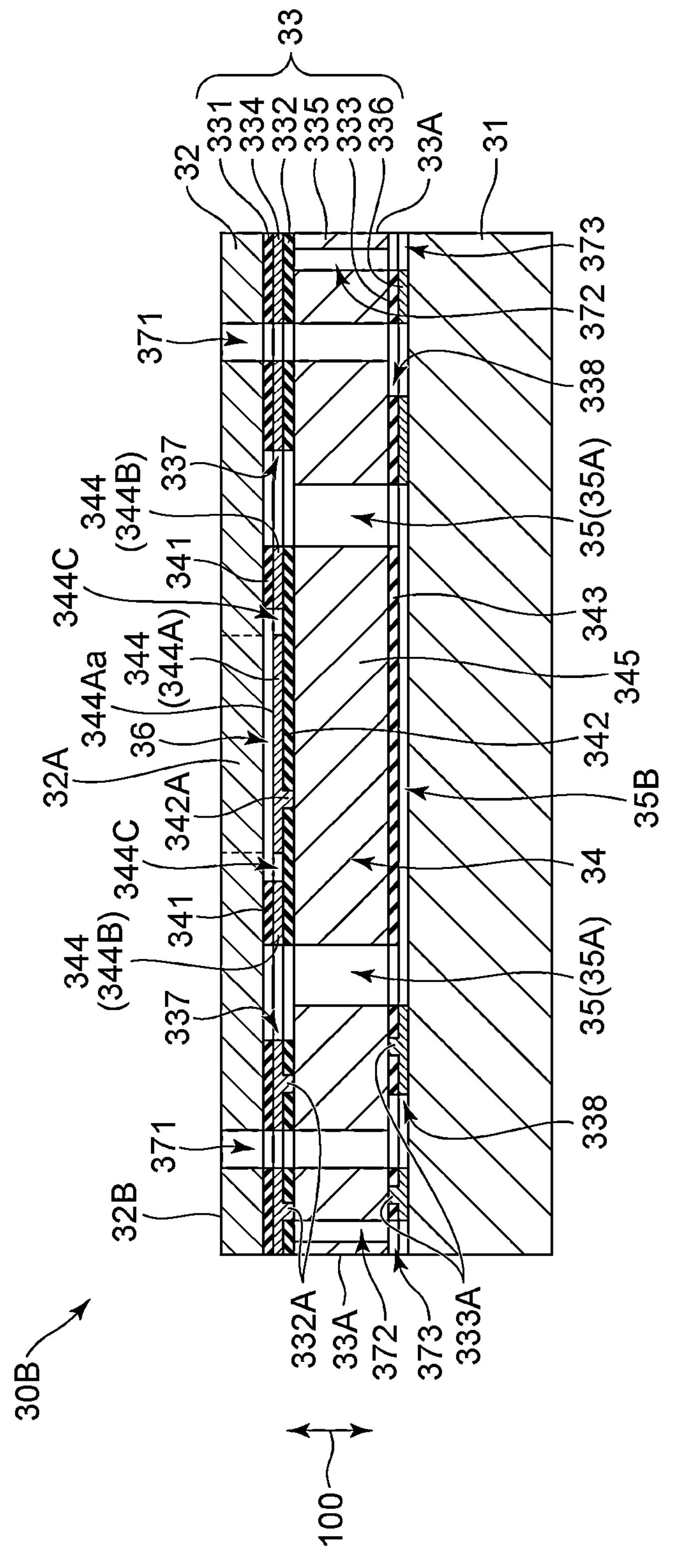
FIG. 9 is a longitudinal sectional view of a pressure-sensing element included in a pressure sensor according to a third example embodiment of the present invention.

FIG. 9 is a longitudinal sectional view of a pressure-sensing element included in a pressure sensor according to a third example embodiment of the present invention. The differences between the pressure sensor according to the third example embodiment and the pressure sensor 10 according to the first example embodiment is in the pressure-sensing element. More specifically, the pressure sensor according to the third example embodiment includes a pressure-sensing element 30B, which includes a groove 373. The following describes the differences between the first example embodiment and the present example embodiment. Each element of the pressure sensor 10 according to the first example embodiment and the corresponding element of the pressure sensor according to the present example embodiment are denoted by the same reference sign. In general, features common to the pressure sensor 10 according to the first example embodiment and the pressure sensor according to the present example embodiment will not be further described here unless otherwise necessary.

Referring to FIG. 9, the pressure-sensing element 30B includes, in addition to the trench 371, a trench 372.

The trench 372 extends through the second conductive layer 335, the third insulating layer 333, and the third conductive layer 336 of the guard 33. In some example embodiments, however, not all of the layers are penetrated by the trench 372. It is preferable that the trench 372 is provided at least in the guard 33.

The trench 372 is closer than the trench 371 to the outer side portion and has a closed shape when viewed in the thickness direction 100. The trench 372 may be farther than the trench 371 from the outer side portion when viewed in the thickness direction 100. It is not required that the trench 372 has a closed shape.

The groove 373 is provided in an outer side surface 33A of the guard 33. The groove 373 is connected to the trench 372.

The groove 373 is an empty space from which a portion of the third insulating layer 333 and a portion of the third conductive layer 336 have been removed by, for example, etching or any other known method. The groove 373 as described above is located between the second conductive layer 335 and the substrate 31.

It is not required that the position and size of the groove 373 are as illustrated in FIG. 9. For example, the groove 373 may be an empty space from which a portion of the second insulating layer 332 has been removed. The groove 373 as described above is located between the first conductive layer 334 and the second conductive layer 335 and is shallower than the one illustrated in FIG. 9.

The groove 373 may be connected to more than one trench. For example, the groove 373 may be connected to the trench 371 as well as to the trench 372. That is, the groove 373 may be connected to at least one of the trenches provided in the pressure-sensing element 30B.

More than one groove 373 may be provided in the outer side surface 33A of the guard 33. For example, a groove that is provided in addition to the groove 373 illustrated in FIG. 9 may be an empty space from which a portion of the second insulating layer 332 has been removed. In this case, for example, the groove 373 and the groove described above may each be connected to one of the trenches 371 and 372. For example, the groove 373 is connected to the trench 371, and the groove described above is connected to the trench 372. Alternatively, the groove 373 may be connected to the trench 372, and the groove described above may be connected to the trench 371.

When the substrate 31 bends, the transfer of bending stress from the substrate 31 to the base 34 is reduced or prevented by the groove 373 in the third example embodiment.

Fourth Example Embodiment

Figure 10:
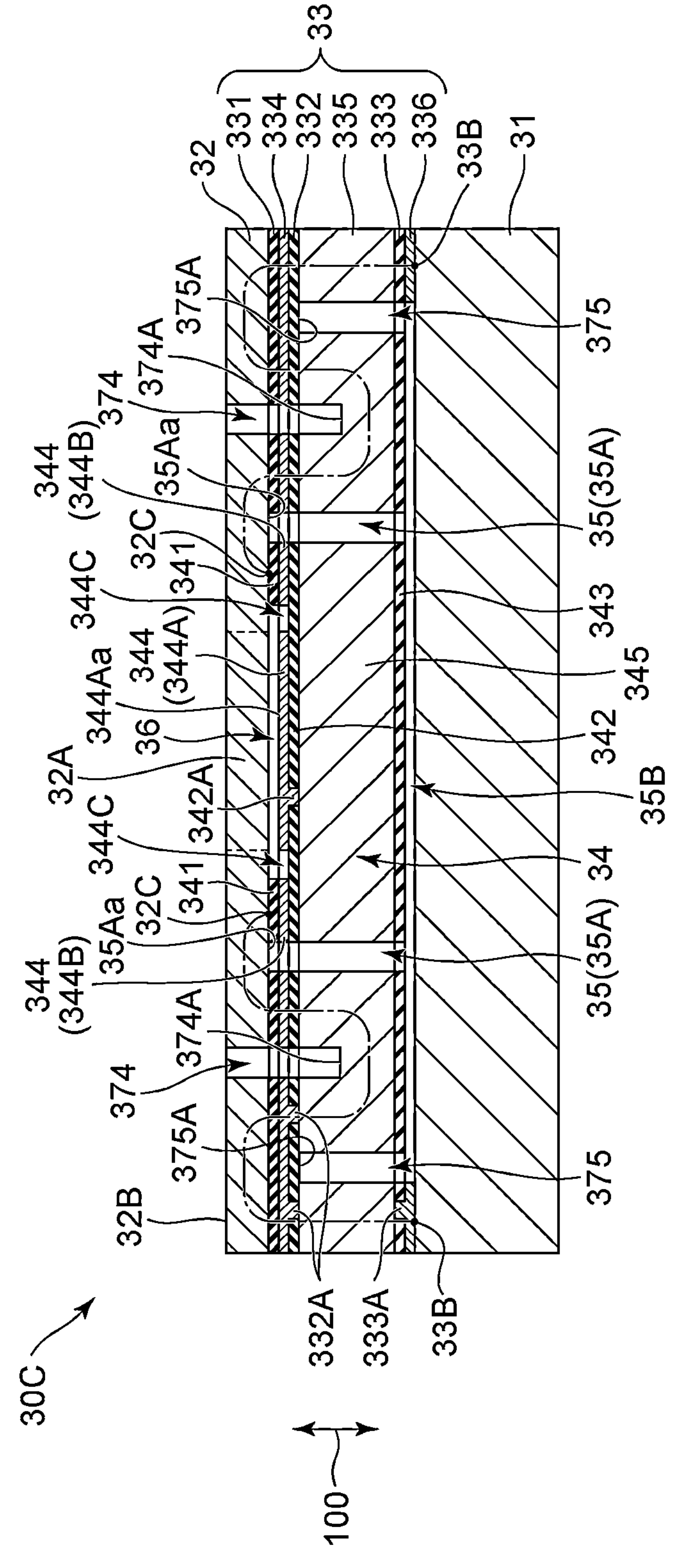
FIG. 10 is a longitudinal sectional view of a pressure-sensing element included in a pressure sensor according to a fourth example embodiment of the present invention.

FIG. 10 is a longitudinal sectional view of a pressure-sensing element included in a pressure sensor according to a fourth example embodiment of the present invention. The differences between the pressure sensor according to the fourth example embodiment and the pressure sensor 10 according to the first example embodiment is in the pressure-sensing element. More specifically, the pressure sensor according to the fourth example embodiment includes a pressure-sensing element 30C, in which the guard 33 and the membrane 32 define a meandering portion including a winding portion that extends up and down in the thickness direction 100 within a region stretching from a junction of the guard 33 and the substrate 31 to a junction of the membrane 32 and the base 34. The following describes the differences between the first example embodiment and the present example embodiment. Each element of the pressure sensor 10 according to the first example embodiment and the corresponding element of the pressure sensor according to the present example embodiment are denoted by the same reference sign. In general, features common to the pressure sensor 10 according to the first example embodiment and the pressure sensor according to the present example embodiment will not be further described here unless otherwise necessary.

Referring to FIG. 10, the pressure-sensing element 30C includes a trench 374 and a trench 375.

The trench 374 extends in the thickness direction 100 entirely through the membrane 32. The trench 374 also extends in the thickness direction 100 partially through the second conductive layer 335 of the guard 33. The trench 374 has a closed shape when viewed in the thickness direction 100.

The trench 375 extends through the second conductive layer 335, the third insulating layer 333, and the third conductive layer 336 of the guard 33. The trench 375 is closer than the trench 374 to the outer side portion and has a closed shape when viewed in the thickness direction 100.

An end portion 374A of the trench 374 is closer than the other end portion of the trench 374 to the substrate 31, and an end portion 375A of the trench 375 is closer than the other end portion of the trench 375 to the membrane 32. The end portion 374A of the trench 374 is closer than the end portion 375A of the trench 375 to the substrate 31. This means that two adjacent ones of the trenches 374, 375, and 35A or, more specifically, the trenches 374 and 375 that are located side by side as viewed in the thickness direction 100 are offset from each other in the thickness direction 100. Offset from each other in the thickness direction 100 means not in alignment or not in positional agreement with each other in the thickness direction 100.

The end portion 374A closer than the other end portion of the trench 374 to the substrate 31 is closer than an end portion 35Aa of the trench 35A in the enclosed space 35 to the substrate 31. The end portion 35Aa is closer than the other end portion of the trench 35A to the membrane 32. This means that two adjacent ones of the trenches 374, 375, and 35A or, more specifically, the trenches 374 and 35A that are located side by side as viewed in the thickness direction 100 are offset from each other in the thickness direction 100.

Accordingly, the guard 33 and the membrane 32 define a meandering portion (denoted by a dash-dot line in FIG. 10) including a winding portion that extends up and down in the thickness direction within a region stretching from a junction 33B of the guard 33 and the substrate 31 to a junction 32C of the membrane 32 and the base 34. Referring to FIG. 10, the third conductive layer 336 is not located in an internal region enclosed with the trench 375 when viewed in the thickness direction 100. The trench 375 is thus connected to the enclosed space 35. Except for the junction 33B, the winding portion of the meandering portion including the guard 33 and the membrane 32 is spaced away from the substrate 31. The winding portion except for the junction 33B can be separated from the substrate 31 without the third conductive layer 336 having to be spaced away of the internal region. In some example embodiments, for example, the third insulating layer 333 is not located in the internal region enclosed with the trench 375 as viewed in the thickness direction 100 so that the winding portion except for the junction 33B is spaced away from the substrate 31.

The trenches 374 and 375 are not necessarily provided in the layers described above with reference to FIG. 10. Although the pressure-sensing element 30C illustrated in FIG. 10 includes, in addition to the trench 35A, two trenches denoted by 374 and 375, the pressure-sensing element 30C may include one trench or three or more trenches in addition to the trench 35A. It is preferable that the guard 33 and the membrane 32 define a meandering portion including a winding portion defined by the trenches. It is also preferable that at least one of the trenches extend in the thickness direction 100 entirely through the membrane 32 and at least partially through the guard 33.

In some example embodiments, the trenches 374 and 375 each have a shape other than the closed shape. In this case, the above-described meandering portion preferably includes only one or more portions of the guard 33 and one or more portions of the membrane 32 (portions facing the trenches 374 and 375) when viewed in the thickness direction 100. In other words, the above-described meandering portion includes at least a portion of the guard 33 and at least a portion of the membrane 32.

When the substrate 31 bends, the bending stress exerted on the substrate 31 is transferred to the base 34 through the guard 33 and the membrane 32. In the fourth example embodiment, at least a portion of the guard 33 and at least a portion of the membrane 32 define a meandering portion including a winding portion that extends up and down in the thickness direction 100 within the region stretching from the junction 33B of the guard 33 and the substrate 31 to the junction 32C of the membrane 32 and the base 34. This means that the path over which the bending stress exerted on the substrate 31 is transferred to the base 34 is elongated. This eliminates or reduces the possibility that the bending stress will reach the base 34.

Fifth Example Embodiment

Figure 11:
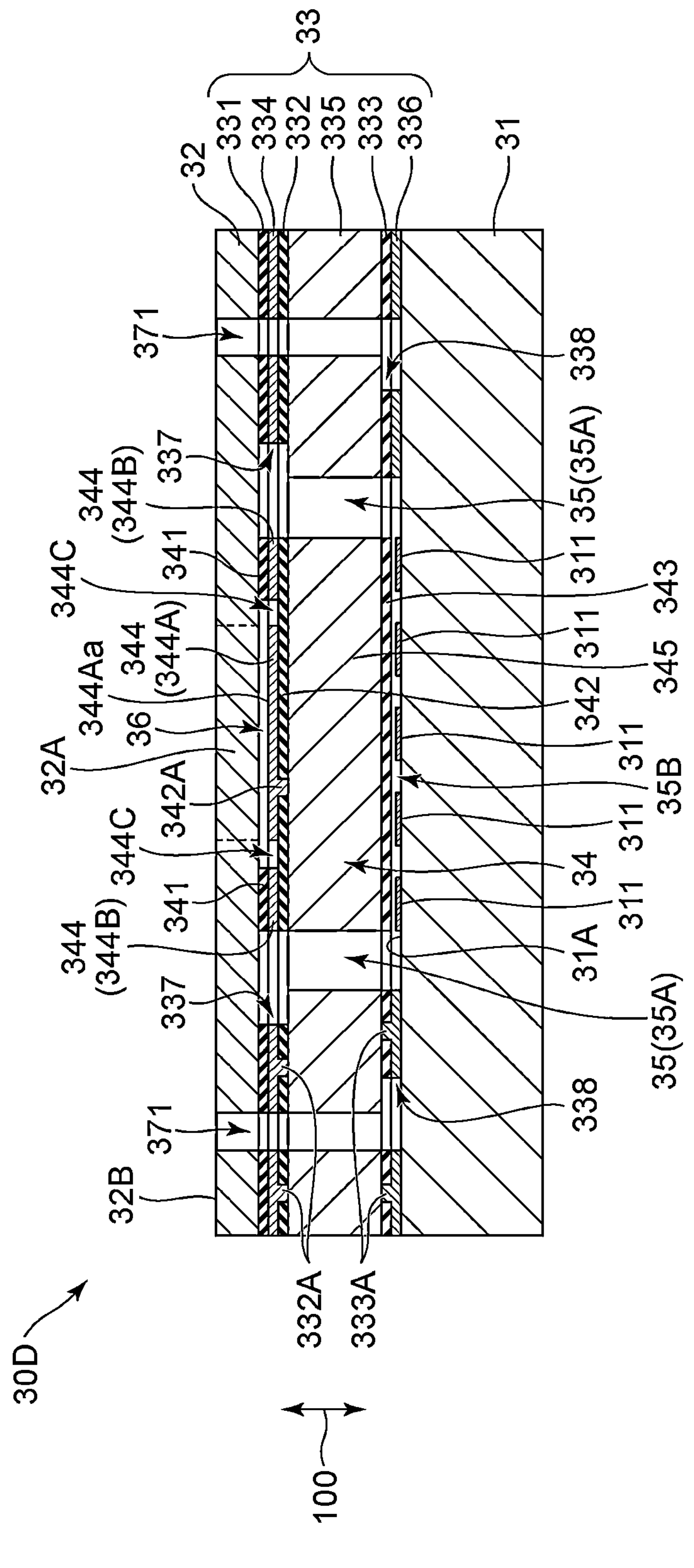
FIG. 11 is a longitudinal sectional view of a pressure-sensing element included in a pressure sensor according to a fifth example embodiment of the present invention.

FIG. 11 is a longitudinal sectional view of a pressure-sensing element included in a pressure sensor according to a fifth example embodiment of the present invention. The differences between the pressure sensor according to the fifth example embodiment and the pressure sensor 10 according to the first example embodiment is in the pressure-sensing element. More specifically, the pressure sensor according to the fifth example embodiment includes a pressure-sensing element 30D, in which the substrate 31 has protrusions 311. The following describes the differences between the first example embodiment and the present example embodiment. Each element of the pressure sensor 10 according to the first example embodiment and the corresponding element of the pressure sensor according to the present example embodiment are denoted by the same reference sign. In general, features common to the pressure sensor 10 according to the first example embodiment and the pressure sensor according to the present example embodiment will not be further described here unless otherwise necessary.

Referring to FIG. 11, the substrate 31 of the pressure-sensing element 30D includes protrusions each denoted by 311 and located on an upper surface 31A of the substrate 31. The upper surface 31A is positioned toward the base 34. The protrusions 311 face the base 34 and protrude toward the base 34. Thus, the substrate 31 and the base 34 are in close proximity to each other within portion of the clearance 35B in the enclosed space 35 or, more specifically, within the region where the protrusions 311 are provided.

With the protrusions 311 facing the base 34 and protruding toward the base 34, it is not required that the number, size, and layout of the protrusions 311 are as illustrated in FIG. 11.

When the membrane 32 bends, the base 34 can possibly bend excessively in conjunction with the membrane 32, and the resultant deviation in the distance between the base 34 and the diaphragm 32A can reduce the accuracy of pressure measurement. When the membrane 32 bends and the base 34 bends excessively in conjunction with the membrane 32, stress would concentrate on the junction of the base 34 and the membrane 32, and as a result, the base 34 and the membrane 32 would become damaged. This problem is addressed by the fifth example embodiment, in which the base 34 including the protrusions 311 is in close proximity to the substrate 31. The protrusions 311 reduces or prevents the excessive bending of the base 34.

Sixth Example Embodiment

Figure 12:
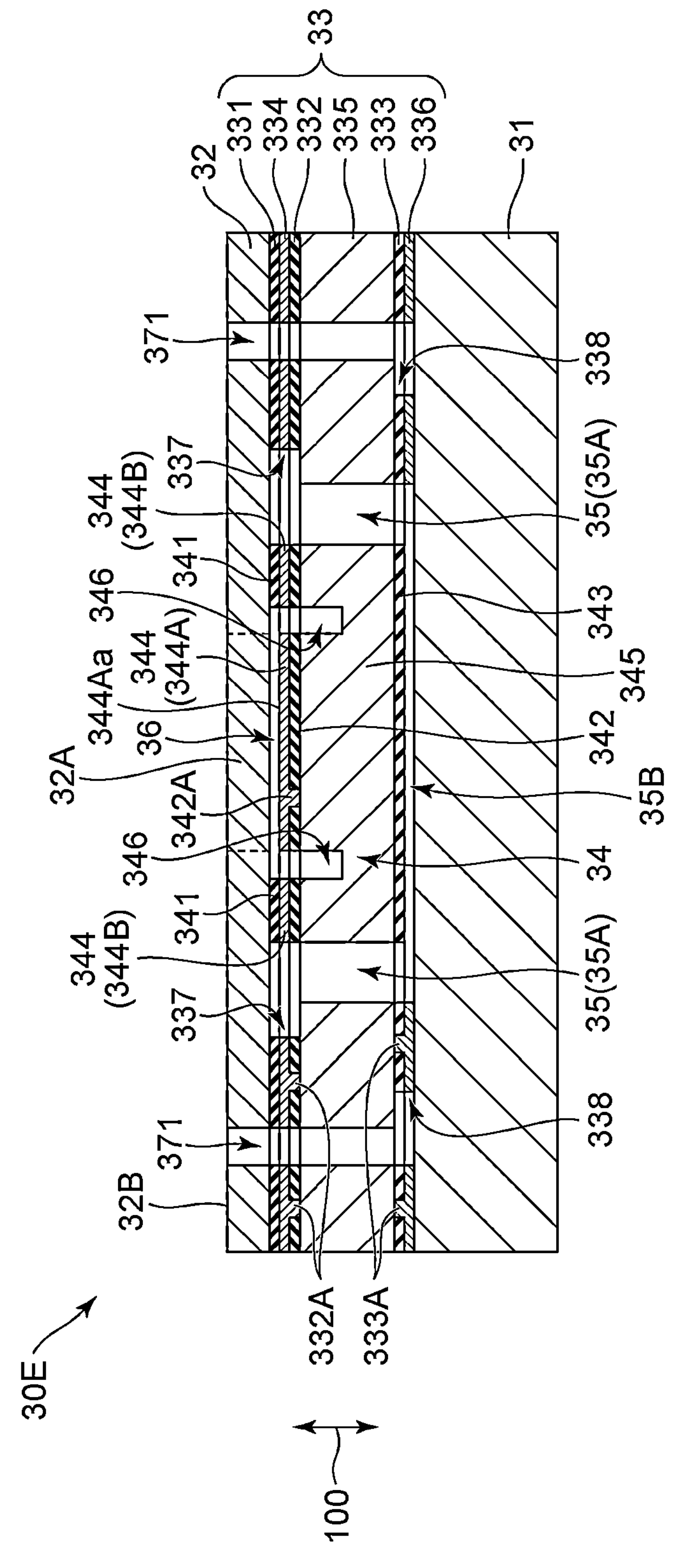
FIG. 12 is a longitudinal sectional view of a pressure-sensing element included in a pressure sensor according to a sixth example embodiment of the present invention.

FIG. 12 is a longitudinal sectional view of a pressure-sensing element included in a pressure sensor according to a sixth example embodiment of the present invention. The differences between the pressure sensor according to the sixth example embodiment and the pressure sensor 10 according to the first example embodiment is in the pressure-sensing element. More specifically, the pressure sensor according to the sixth example embodiment includes a pressure-sensing element 30E, in which the base 34 includes a base trench 346. The following describes the differences between the first example embodiment and the present example embodiment. Each element of the pressure sensor 10 according to the first example embodiment and the corresponding element of the pressure sensor according to the present example embodiment are denoted by the same reference sign. In general, features common to the pressure sensor 10 according to the first example embodiment and the pressure sensor according to the present example embodiment will not be further described here unless otherwise necessary.

Referring to FIG. 12, the base 34 of the pressure-sensing element 30E includes the base trench 346.

The base 34 includes the base trench 346 in its surface oriented toward the pressure reference chamber 36. The base trench 346 is connected to the pressure reference chamber 36. The base trench 346 may preferably extend entirely through the first conductive layer 344 and the second insulating layer 342 and extends partially through the second conductive layer 345. The base trench 346 has a closed shape when viewed in the thickness direction 100.

The first electrode 344A and the second electrode 344B of the pressure-sensing element 30E are separated from each other by the base trench 346.

It is not required that the base trench 346 have a closed shape when viewed in the thickness direction 100. The depth of the base trench 346 is not necessarily as illustrated FIG. 12. For example, the base trench 346 may extend entirely through the second conductive layer 345 as well as through the first conductive layer 344 and the second insulating layer 342. It is not required that the base trench 346 is located as illustrated in FIG. 12, in which the first electrode 344A and the second electrode 344B are separated by the base trench 346. That is, it is not required that the first electrode 344A and the second electrode 344B are separated by the base trench 346. For example, the first electrode 344A and the second electrode 344B may be separated by the clearance 344C as in the first example embodiment.

The pressure reference chamber 36 in the sixth example embodiment is connected to base trench 346. This means that an extra volume is added to the space in which the pressure reference chamber 36 is located. Given that pressure-sensing elements (the pressure-sensing elements 30E) may be produced in large numbers, this feature leads to a reduction of the product-to-product variation in the internal pressure of the pressure reference chamber 36.

The path over which the stress is transferred from the junction of the base 34 and the membrane 32 to a portion of the base 34 that is across from the diaphragm 32A is detoured by the base trench 346 in the sixth example embodiment. This eliminates or reduces the possibility that the stress will reach the portion of the base 34, that is, the portion located across from the diaphragm portion 32A.

Seventh Example Embodiment

Figure 13:
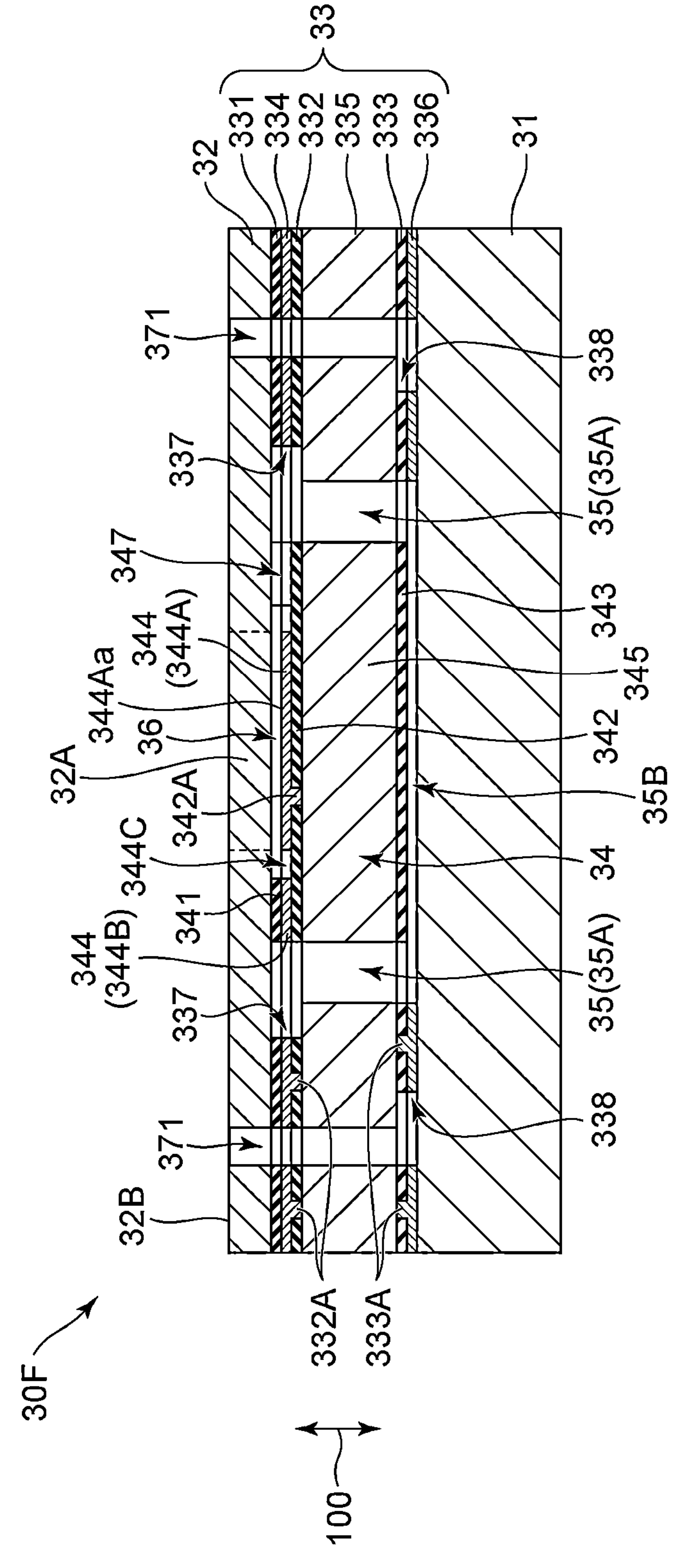
FIG. 13 is a longitudinal sectional view of a pressure-sensing element included in a pressure sensor according to a seventh example embodiment of the present invention.

FIG. 13 is a longitudinal sectional view of a pressure-sensing element included in a pressure sensor according to a seventh example embodiment of the present invention. The differences between the pressure sensor according to the seventh example embodiment and the pressure sensor 10 according to the first example embodiment is in the pressure-sensing element. More specifically, the pressure sensor according to the seventh example embodiment includes a pressure-sensing element 30F, in which the pressure reference chamber 36 and the enclosed space 35 are in communication. The following describes the differences between the first example embodiment and the present example embodiment. Each element of the pressure sensor 10 according to the first example embodiment and the corresponding element of the pressure sensor according to the present example embodiment are denoted by the same reference sign. In general, features common to the pressure sensor 10 according to the first example embodiment and the pressure sensor according to the present example embodiment will not be further described here unless otherwise necessary.

Referring to FIG. 13, the pressure-sensing element 30F includes a communicating portion 347, which is provided in portion of the first insulating layer 341 and portion of the second electrode 344B. The communicating portion 347 defines a connection between the pressure reference chamber 36 and the trench 35A in the enclosed space 35. The communicating portion 347 is an empty space from which portion of the first insulating layer 341 and portion of the second electrode 344B have been removed by, for example, etching or any other known method.

It is not required that the communicating portion 347 is as illustrated in FIG. 13. For example, the communicating portion 347 may be provided in portion of the first insulating layer 341 only. Alternatively, for example, the communicating portion 347 may extend in the thickness direction 100 through the base 34 to define a connection between the pressure reference chamber 36 and the clearance 35B in the enclosed space 35.

In the seventh example embodiment, the pressure reference chamber 36 and the enclosed space 35 defined by the membrane 32, the substrate 31, and the guard 33 are in communication. This means that an extra volume is added to the space in which the pressure reference chamber 36 is located. Given that pressure-sensing elements (the pressure-sensing elements 30F) may be produced in large numbers, this feature leads to a reduction of the product-to-product variation in the internal pressure of the pressure reference chamber 36.

The example embodiments described above may be provided in varying combinations where appropriate in such a way as to be effectual.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A pressure-sensing element comprising:

a membrane including a diaphragm;

a substrate opposite to the membrane in a thickness direction;

a guard between the membrane and the substrate and bonded to the membrane and the substrate, the guard having a closed shape; and a base in an enclosed space defined by the membrane, the substrate, and the guard, the base being bonded to the membrane and being spaced away from the substrate and the guard; wherein a portion of a surface of the base closer than another surface of the base to the membrane is opposed to the diaphragm with a pressure reference chamber located between the portion of the surface and the diaphragm to provide electrostatic capacitance between the base and the membrane;

the base, except for the portion of the surface of the base closer than the other surface of the base to the membrane, is bonded to the membrane;

one or more trenches with a depth direction coinciding with the thickness direction are provided at least in the guard;

at least one of the one or more trenches is provided in the guard and the membrane and extends in the thickness direction entirely through the membrane and at least partially through the guard;

a slit extending in the thickness direction is provided on at least one of a side of the guard closer to the membrane and a side of the guard closer to the substrate;

the slit on the side of the guard closer to the membrane extends outward from the enclosed space when viewed in the thickness direction; and the slit on the side of the guard closer to the substrate extends inward from the trench when viewed in the thickness direction.

2. The pressure-sensing element according to claim 1, wherein the guard includes a groove in an outer side surface of the guard and connected to at least one of the one or more trenches.

3. The pressure-sensing element according to claim 1, wherein the one or more trenches includes a plurality of trenches at least in the guard; and with two adjacent ones of the plurality of trenches being positioned side by side as viewed in the thickness direction and being offset from each other in the thickness direction, at least a portion of the guard and at least a portion of the membrane define a meandering portion including a winding portion extending up and down in the thickness direction within a region extending from a junction of the guard and the substrate to a junction of the membrane and the base.

4. The pressure-sensing element according to claim 1, wherein the substrate includes a protrusion protruding toward the base from a surface adjacent to the base.

5. The pressure-sensing element according to claim 1, wherein the base includes a base trench in a surface adjacent to the pressure reference chamber, the base trench being connected to the pressure reference chamber.

6. The pressure-sensing element according to claim 1, wherein the pressure reference chamber and the enclosed space are in communication with each other.

7. A pressure sensor comprising:

the pressure-sensing element according to claim 1;

a mounting substrate including a mounting surface on which the pressure-sensing element is mounted; and a resin package on the mounting surface of the mounting substrate and covering the pressure-sensing element; wherein the resin package includes an exposure hole through which the diaphragm is exposed.

8. The pressure sensor according to claim 7, wherein the pressure-sensing element further includes a pad to provide an external electrical connection to the base; and the pad is opposite to the base with the trench located therebetween when viewed in the thickness direction.

9. A pressure-sensing element comprising:

a membrane including a diaphragm;

a substrate opposite to the membrane in a thickness direction;

a guard between the membrane and the substrate and bonded to the membrane and the substrate, the guard having a closed shape; and a base in an enclosed space defined by the membrane, the substrate, and the guard, the base being bonded to the membrane and being spaced away from the substrate and the guard; wherein a portion of a surface of the base closer than another surface of the base to the membrane is opposed to the diaphragm with a pressure reference chamber located between the portion of the surface and the diaphragm to provide electrostatic capacitance between the base and the membrane;

the base, except for the portion of the surface of the base closer than the other surface of the base to the membrane, is bonded to the membrane;

one or more trenches with a depth direction coinciding with the thickness direction are provided at least in the guard;

at least one of the one or more trenches is provided in the guard and the membrane and extends in the thickness direction entirely through the membrane and at least partially through the guard;

the base includes a first electrode and a second electrode separate from the first electrode;

the first electrode faces the pressure reference chamber; and the second electrode is bonded to the membrane with an insulator therebetween.

10. The pressure-sensing element according to claim 9, wherein the guard includes a groove in an outer side surface of the guard and connected to at least one of the one or more trenches.

11. The pressure-sensing element according to claim 9, wherein the one or more trenches includes a plurality of trenches at least in the guard; and with two adjacent ones of the plurality of trenches being positioned side by side as viewed in the thickness direction and being offset from each other in the thickness direction, at least a portion of the guard and at least a portion of the membrane define a meandering portion including a winding portion extending up and down in the thickness direction within a region extending from a junction of the guard and the substrate to a junction of the membrane and the base.

12. The pressure-sensing element according to claim 9, wherein the substrate includes a protrusion protruding toward the base from a surface adjacent to the base.

13. The pressure-sensing element according to claim 9, wherein the base includes a base trench in a surface adjacent to the pressure reference chamber, the base trench being connected to the pressure reference chamber.

14. The pressure-sensing element according to claim 9, wherein the pressure reference chamber and the enclosed space are in communication with each other.

15. A pressure sensor comprising:

the pressure-sensing element according to claim 9;

a mounting substrate including a mounting surface on which the pressure-sensing element is mounted; and a resin package on the mounting surface of the mounting substrate and covering the pressure-sensing element; wherein the resin package includes an exposure hole through which the diaphragm is exposed.

16. The pressure sensor according to claim 15, wherein the pressure-sensing element further includes a pad to provide an external electrical connection to the base; and the pad is opposite to the base with the trench located therebetween when viewed in the thickness direction.

17. A pressure-sensing element comprising:

a membrane including a diaphragm;

a substrate opposite to the membrane in a thickness direction;

a guard between the membrane and the substrate and bonded to the membrane and the substrate, the guard having a closed shape; and a base in an enclosed space defined by the membrane, the substrate, and the guard, the base being bonded to the membrane and being spaced away from the substrate and the guard; wherein a portion of a surface of the base closer than another surface of the base to the membrane is opposed to the diaphragm with a pressure reference chamber located between the portion of the surface and the diaphragm to provide electrostatic capacitance between the base and the membrane;

the base, except for the portion of the surface of the base closer than the other surface of the base to the membrane, is bonded to the membrane;

one or more trenches with a depth direction coinciding with the thickness direction are provided at least in the guard;

at least one of the one or more trenches is provided in the guard and the membrane and extends in the thickness direction entirely through the membrane and at least partially through the guard; and the guard is electrically connected to the substrate.

18. A pressure sensor comprising:

the pressure-sensing element according to claim 17;

a mounting substrate including a mounting surface on which the pressure-sensing element is mounted; and a resin package on the mounting surface of the mounting substrate and covering the pressure-sensing element; wherein the resin package includes an exposure hole through which the diaphragm is exposed.

19. The pressure sensor according to claim 18, wherein the pressure-sensing element further includes a pad to provide an external electrical connection to the base; and the pad is opposite to the base with the trench located therebetween when viewed in the thickness direction.

* * * * *